(12) United States Patent
Tsugimatsu et al.

(10) Patent No.: US 6,746,080 B2
(45) Date of Patent: Jun. 8, 2004

(54) CHILD CAR SEAT

(75) Inventors: Miho Tsugimatsu, Saitama (JP); Yukio Sakamoto, Saitama (JP); Yusuke Arii, Saitama (JP); Takeshi Furui, Saitama (JP)

(73) Assignee: Combi Corporation, Tokyo-To (JP)

( * ) Notice: Subject to any disclaimer, the term of this patent is extended or adjusted under 35 U.S.C. 154(b) by 0 days.

(21) Appl. No.: 10/112,880

(22) Filed: Apr. 2, 2002

(65) Prior Publication Data

US 2002/0145319 A1 Oct. 10, 2002

(30) Foreign Application Priority Data

| Apr. 5, 2001 | (JP) | 2001-107698 |
| Apr. 5, 2001 | (JP) | 2001-107705 |
| Apr. 5, 2001 | (JP) | 2001-107718 |
| Apr. 5, 2001 | (JP) | 2001-107722 |
| Apr. 5, 2001 | (JP) | 2001-107731 |

(51) Int. Cl.$^7$ ................................................. A47C 1/08
(52) U.S. Cl. ...................... 297/256.13; 297/256.16; 297/216.11; 297/256.14
(58) Field of Search ................. 297/256.13, 256.14, 297/256.12, 250.1, 216.11, 216.19, 216.1, 256.1, 256.15, 256.16

(56) References Cited

U.S. PATENT DOCUMENTS

| 3,934,934 A | * | 1/1976 | Farrell et al. ................ 297/467 |
| 4,345,791 A | * | 8/1982 | Bryans et al. ........... 297/256.14 |
| 4,762,364 A | | 8/1988 | Young |
| 4,915,446 A | * | 4/1990 | Darling et al. .......... 297/256.14 |
| 4,936,629 A | * | 6/1990 | Young ..................... 297/256.12 |
| 5,277,472 A | * | 1/1994 | Freese et al. ................ 297/130 |
| 5,551,751 A | * | 9/1996 | Sedlack et al. ......... 297/256.13 |
| 6,139,101 A | * | 10/2000 | Berringer et al. ......... 297/256.1 |
| 6,237,995 B1 | * | 5/2001 | Dierickx ..................... 297/130 |
| 6,412,865 B1 | * | 7/2002 | Bedard .................... 297/250.1 |
| 6,431,647 B2 | * | 8/2002 | Yamazaki .............. 297/256.12 |
| 6,454,350 B1 | * | 9/2002 | Celestina-Krevh et al. ...... 297/216.11 |

FOREIGN PATENT DOCUMENTS

| DE | 197 44 978 A1 | 4/1999 |
| EP | 0 426 585 A1 | 5/1991 |
| EP | 0 853 018 A1 | 7/1998 |
| FR | 2 796 603 | 1/2001 |
| JP | 10-100760 | 4/1998 |
| JP | 2000-108739 | 4/2000 |
| WO | 90/03746 | 4/1990 |

\* cited by examiner

Primary Examiner—Peter M. Cuomo
Assistant Examiner—Erika Garrett
(74) Attorney, Agent, or Firm—Birch, Stewart, Kolasch & Birch, LLP

(57) ABSTRACT

A child car seat includes a cradle to be fastened to a seat of a vehicle, having a base part and a standing part, a sliding base longitudinally slidably mounted on the cradle. A seat body having a backrest part, is supported for turning on the sliding base. The sliding base tilts gradually as the same slides on the cradle.

24 Claims, 17 Drawing Sheets

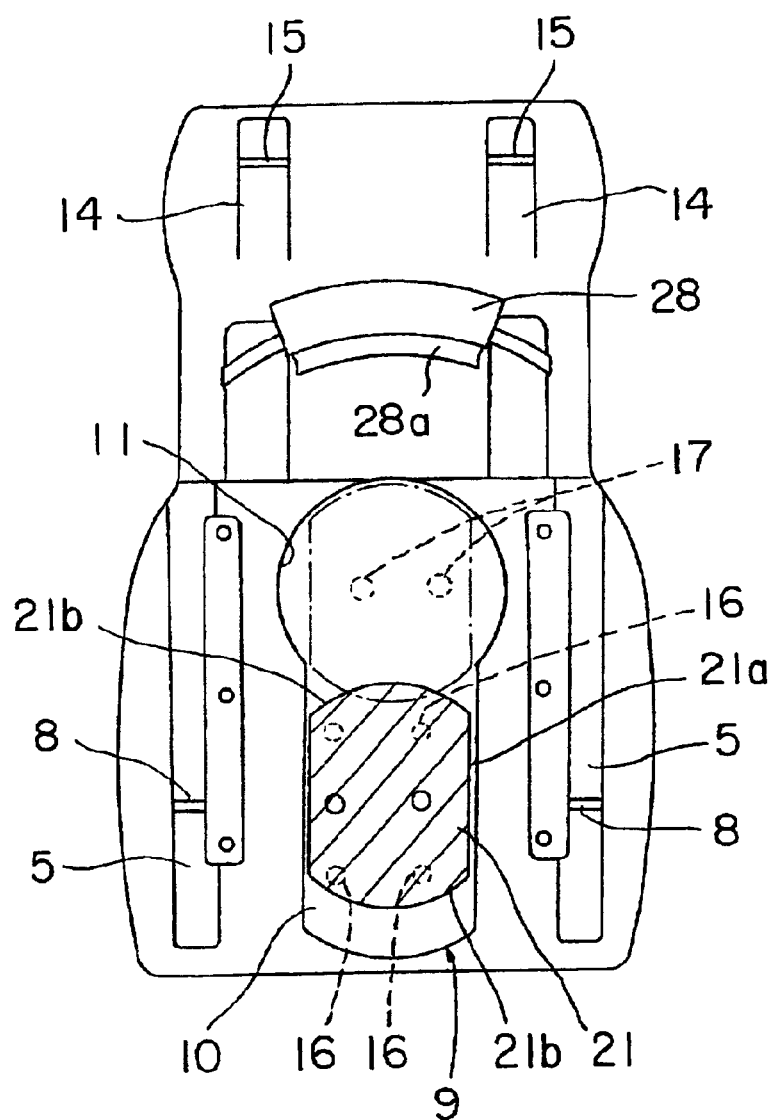
F I G. 6

CHILD CAR SEAT

FIELD OF THE INVNETION

The present invention relates to a child car seat to be attached to a seat of a vehicle.

DESCRIPTION OF THE RELATED ART

It is provided that a child must be seated on a child car seat for protection when carrying the child by vehicle, such as a passenger car. The child car seat is fastened to the auxiliary seat or the rear seat of a passenger car or the like with a seat belt or the like. Generally, a child car seat is set in a forward-turned position to seat a child on the child car seat with thechild's front facing the front.

However, since the use the child car seat in a backward-turned position is effective in avoiding exertion of a sudden, forward shock particularly on the child when the passenger car has an accident, there has been proposed a child car seat having a seat body capable of being turned, and capable of being used selectively in either a forward-turned position or a backward-turned position.

Such a rotating child car seat, however, has a seat body supported by a support structure formed only on a seat part, the backrest of the seat body has a low rigidity, and the backrest of the seat body is deformed greatly when a vehicle mounted with the child car seat has a colliding accident.

SUMMARY OF THE TMMNTTON

The present invention has been made in view of such problems and it is therefore an object of the present invention to provide a child car seat having a seat body capable of being securely held on a cradle on a vehicle, and not subject to unexpected movement or deformation when the vehicle collides with an obstacle.

According to the present invention, a child car seat includes a cradle to be fastened to a seat of a vehicle, having a base part and a standing part; a sliding base mounted slidably in a longitudinal direction on the cradle; and a seat body having a backrest part, turnably supported on the sliding base.

In the child car seat, the sliding base tilts gradually as the same slides on the cradle.

In the child car seat, the seat body is provided on the backside of the backrest part with connecting parts that engage the standing part of the cradle.

In the child car seat, the seat body is provided in its lower part with a disk having a circumferential rail, and the standing part of the cradle is provided with a guide part that engages the circumferential rail to control the sliding movement of the sliding base.

In the child car seat, the base part of the cradle is provided with a guide structure having a straight tilt adjustment section having parallel side walls, and a situation inversion section having the shape of a cylindrical recess and connected to one end of the tilt adjustment section, and the seat body is provided with a sliding foot penetrating the sliding base, and capable of turning in and sliding along the guide structure.

In the child car seat, the sliding foot of the seat body has parallel, opposite side surfaces that slide along the parallel side walls of the tilt adjustment section, and circular parts that slide along the cylindrical side surface of the situation inversion section.

In the child car seat, the sliding foot of the seat body is provided with a pair of locking pins for vertical movement interlocked with a releasing lever on the seat body, the tilt adjustment section is provided with a plurality of pairs of first locking holes, the pair of locking pins engage selectively in one of the pairs of first locking holes, and the situation inversion section is provided with a pair of second locking holes to receive the pair of locking pins therein.

In the child car seat, the distance between each pair of first locking holes of the tilt adjustment section is equal to that of the pair of second locking holes of the situation inversion section.

In the child car seat, each pair of first locking holes of the tilt adjustment section and the pair of second locking holes of the situation inversion section are laterally offset with respect to the longitudinal center axis of the cradle in opposite directions, respectively.

In the child car seat, the standing part of the cradle is provided with connecting pins that engage the connecting parts of the seat body.

In the child car seat, the connecting pins of the standing part of the cradle are capable of sliding and of being released from the connecting parts.

In the child car seat, the slidable connecting pins are connected to operating arms engaged in cam grooves formed in a cam plate vertically movably mounted on the standing part of the cradle, the cam plate is interlocked with a first cam projecting from the cradle into the situation inversion section and capable of being pushed down by the sliding foot of the seat body, the first cam is pushed down to move the cam plate to retract and release the connecting pins from the connecting parts of the seat body, respectively.

In the child car seat, a second cam projects from the tilt adjustment section of the cradle, the second cam is interlocked with the first cam, and the second cam is pushed down by the sliding foot to make the connecting pin engage with the connecting parts through the first cam as the sliding foot is moved from the situation inversion section to the tilt adjustment section.

In the child car seat, an operating shaft capable of being moved forward and backward, is connected to the first cam to lock and unlock the first cam, and an operating dial connected to the operating shaft is disposed on the front surface of the cradle.

In the child car seat, a locking cam is mounted on the same shaft as the first cam in the cradle and is urged so as to project from the situation inversion section, the locking cam is provided with a projection to hold the operating rod at an unlocking position when the operating rod is moved to the unlocking position to unlock the first cam.

In the child car seat, a bend formed in a rear end part of the operating rod extends laterally behind the first cam and the locking cam.

In the child car seat, a projecting part of the locking cam has a front bevel surface extending obliquely upward toward the rear, the bend of the operating rod engages the bevel surface to turn the locking cam when the operating rod is shifted rearward, and the bend engages a rear surface of the projection to hold the operating rod at a releasing position when the bend climbs over the projection.

In the child car seat, a deformation-preventive reinforcing member is attached to a part of a frame corresponding to the backrest part of the seat body.

In the child car seat, opposite side parts of the deformation-preventive reinforcing member are bent to form connecting parts for connecting the seat body to the ding part of the cradle.

In the child car seat, the deformation-preventive reinforcing plate is provided at least a pair of openings through which a child holding belt is passed.

In the child car seat, lock-off devices for fastening a shoulder strap of a seat belt anchored to the seat of the vehicle are provided on the standing part of the cradle, and each of the lock-off devices is tilted such that an upper part thereof is closer to the center axis of the child car seat than a lower part thereof.

In the child car seat, each of the lock-off devices has a base part, a lid supporting knuckle and a lid, and the lid can be held at an open position by the lid supporting knuckle.

In the child car seat, the lid supporting knuckle has an eccentric outer circumference having a large-diameter part, and the lid has a base end which is pressed against the large-diameter part of the lid supporting knuckle when the lid is opened.

In the child car seat, a small projection is formed on an outer circumference of the lid supporting knuckle of each of the lock-off devices, and a base end of the lid rests on the small projection when the lid is opened.

In the child car seat, a guide groove for guiding the seat belt is formed in the base part of the lock-off device.

The child car seat further includes a child holding belt connected to the seat body and having a shoulder strap and an adjusting belt, a quick-adjustment device through which the adjusting belt is passed, capable of adjusting the length of the shoulder strap of the child holding belt, and an automatic take-up device provided on the seat body and connected to a free end of the adjustable belt passed through the quick-adjustment device toward automatic take-up device.

BRIEF DESCRIPTION OF THE DRAWINGS

FIG. 6 is a plan view of the cradle;

DESCRIPTION OF THE PREFERRED EMRODTMENTS

A child car seat in a preferred embodiment according to the present invention according to the present invention will be described with reference to the accompanying drawings.

Figure 1:
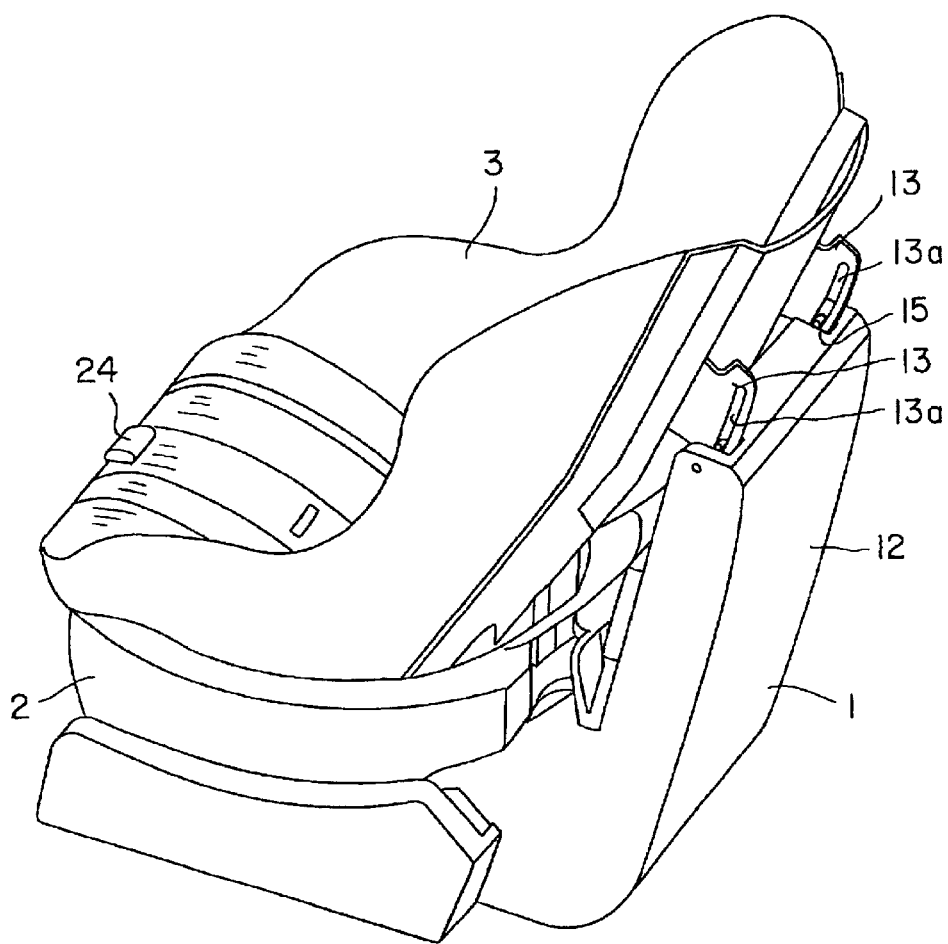
FIG. 1 is a perspective view of a child car seat in a preferred embodiment according to the present invention.
Figure 2:
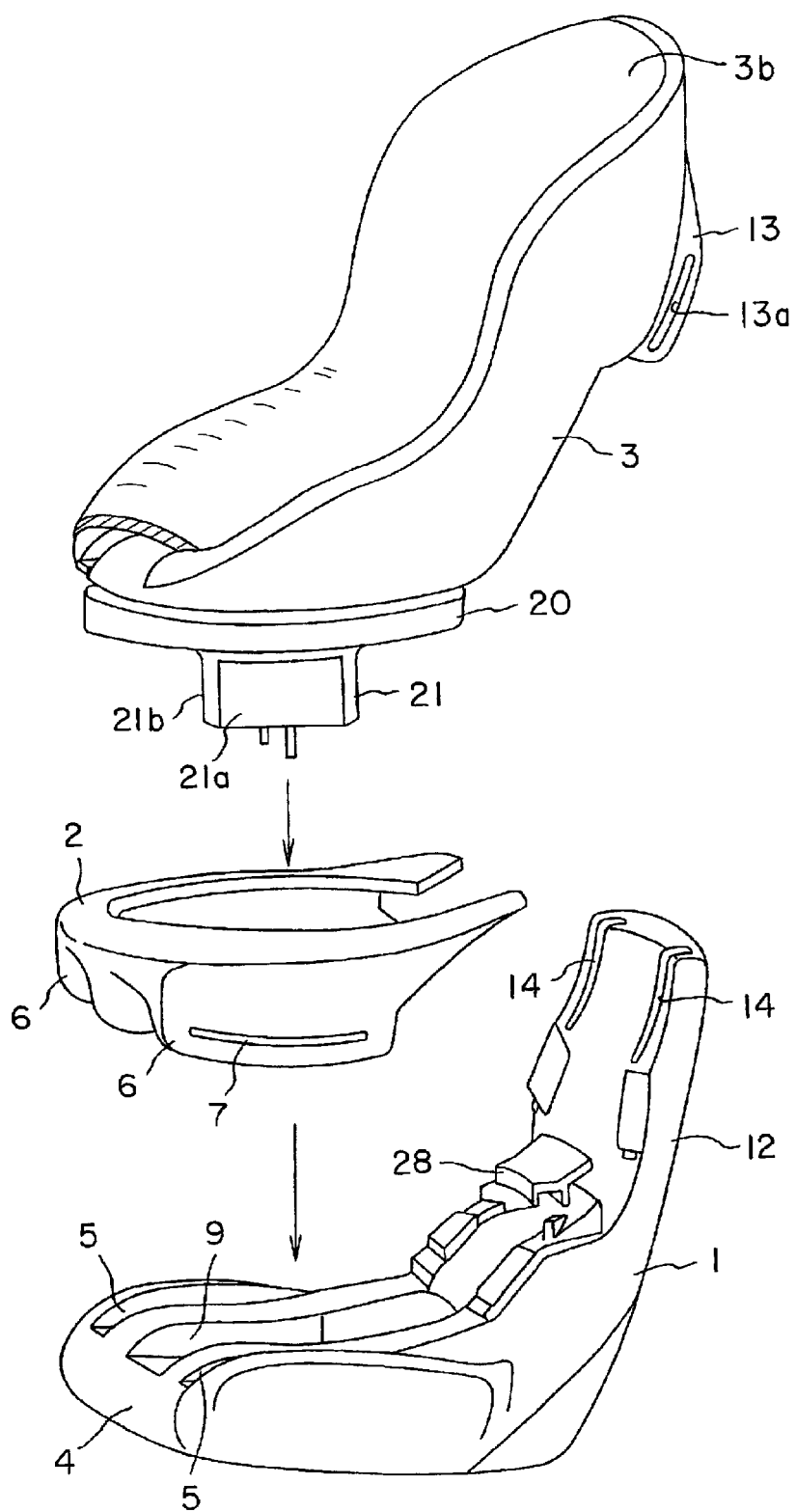
FIG. 2 is an exploded perspective view of the child car seat shown in FIG. 1.

Referring to FIGS. 1 and 2, a child car seat has a cradle 1, a sliding base 2, and a seat body 3. The sliding base 2 is mounted on the cradle 1 so as to be movable only longitudinally, i.e., forward and rearward. The seat body 3 is supported for turning about an axis perpendicular to the surface of the sliding base 2 on the cradle 1.

Figure 3:
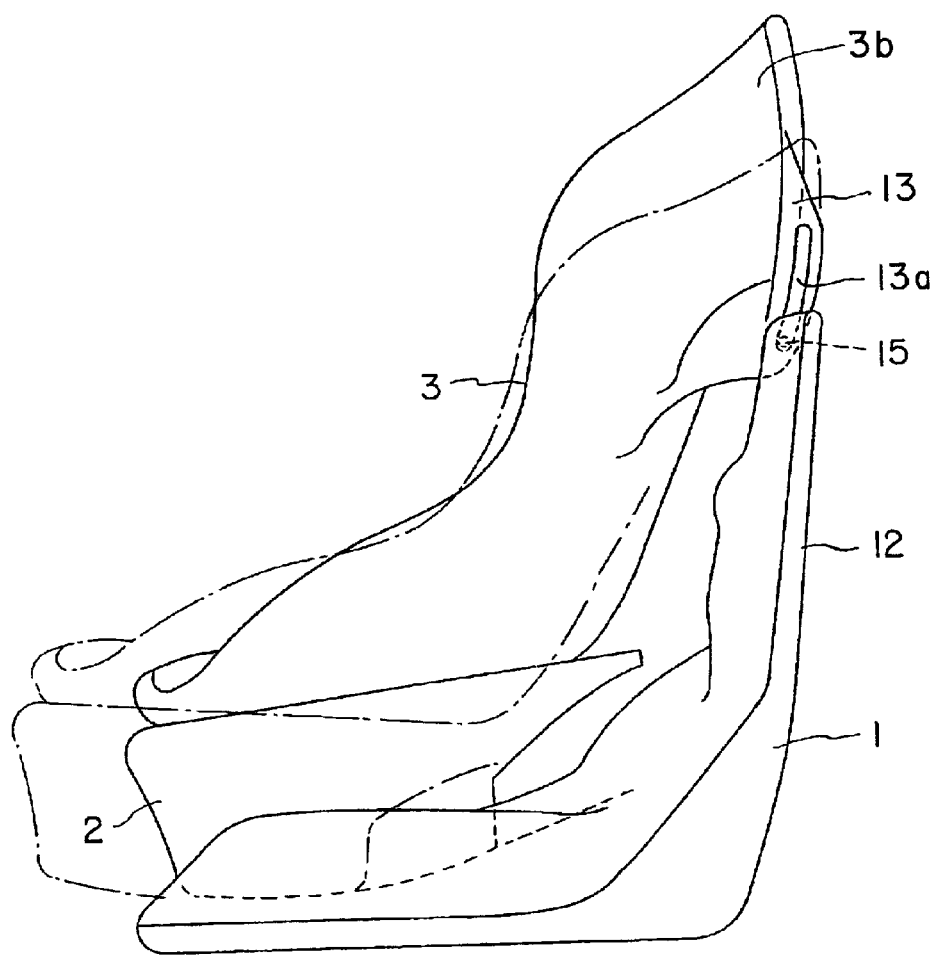
FIG. 3 is a view of assistance in explaining an operation for reclining the child car seat shown in FIG. 1.

The sliding base 2 is moved longitudinally relative to the cradle 1 to set the seat body 3 in a position indicated by continuous lines or in a position indicated by chain lines in FIG. 3, so that the tilt of the seat body 3 set in a forward-turned position can be adjusted. Theseat body 3 can be set in a backward-turned position indicated by chain lines in FIG. 4 by turning the seat body 3 about the axis after setting the seat body 3 in a position indicated by continuous lines in FIG. 4.

Figure 5:
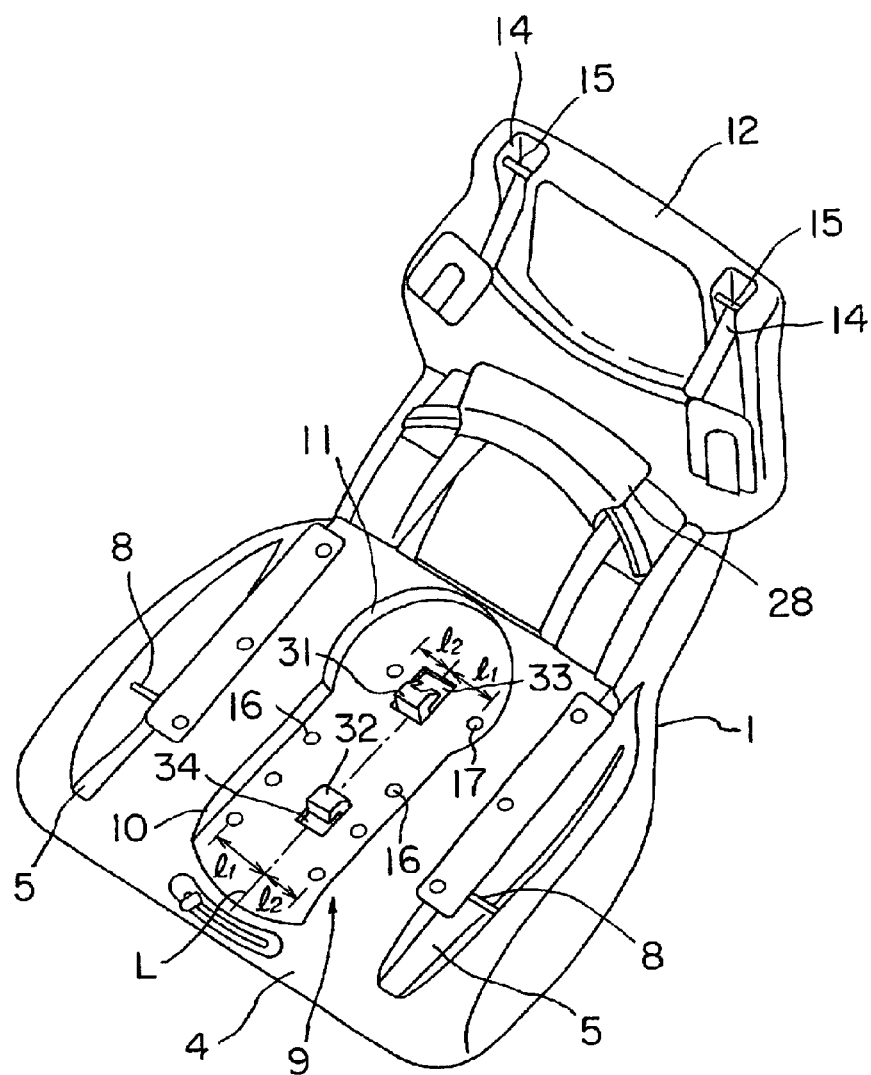
FIG. 5 is a perspective view of a cradle.

As shown in FIGS. 2 and 5, the cradle 1 has a base part 4 provided in its right and left side parts with longitudinal guide grooves 5. Longitudinal legs 6 formed in opposite sides of a lower part of the sliding base 2 are slidably fitted in the guide groove 5. Each of the guide grooves 5 has an upward concaved and curvedbottom surface. The curved bottom surface is curved so as to rise toward the rear part of the sliding base 2. Each of the legs 6 of the sliding base 2 has a downward convex lower surface conforming to the bottom surface of the guide groove 5. As shown in FIG. 2, circular slots 7 are formed in the outer side walls of the legs 6. Limiting pins 8 attached to the cradle 1 engage in the slots 7, respectively, to retain the sliding base 2 on the cradle 1 and to limit the range of movement of the sliding base 2.

A guide structure 9 is extended longitudinally in a central part of the cradle 1. The guide structure 9 has a tilt adjustment section 10 having the shape of a groove and defined by opposite, parallel longitudinal side walls, and a situation inversion section 11 having the shape of a cylindrical recess of a diameter greater than the width of the tilt adjustment section 10. The cradle 1 has a standing part 12. A pair of side grooves 14 are formed in an upper part of the standing part of the cradle 1. Guide parts 13 protruding rearward from the back surface of the seat body 3 are fitted for sliding in the side grooves 14. Connecting pins 15 are inserted laterally in the side grooves 14 so as to be laterally movable. A plurality of pairs of first locking holes 16, three pairs of first locking holes 16 in FIG. 5, are formed in a longitudinal arrangement in the bottom of the tilt adjustment section 10 of the guide structure 9 formed in the central part of the cradle 1. A pair of second locking holes 17 are formed in the bottom of the situation inversion section 11. The center distance between each pair of first locking holes 16 and that of the pair of second locking holes 17 are equal to each other. The pairs of first locking holes 16 and the pair of second locking holes 17 are offset in opposite directions, respectively, with respect to the longitudinal axis L of the cradle 1. That is, the left first locking hole 16 and the right second locking hole 17 are at a distance 11 from the longitudinal axis L, and the right first locking hole 16 and the left second locking hole 17 are at a distance $L_2$ from the longitudinal axis L.

Figure 7:
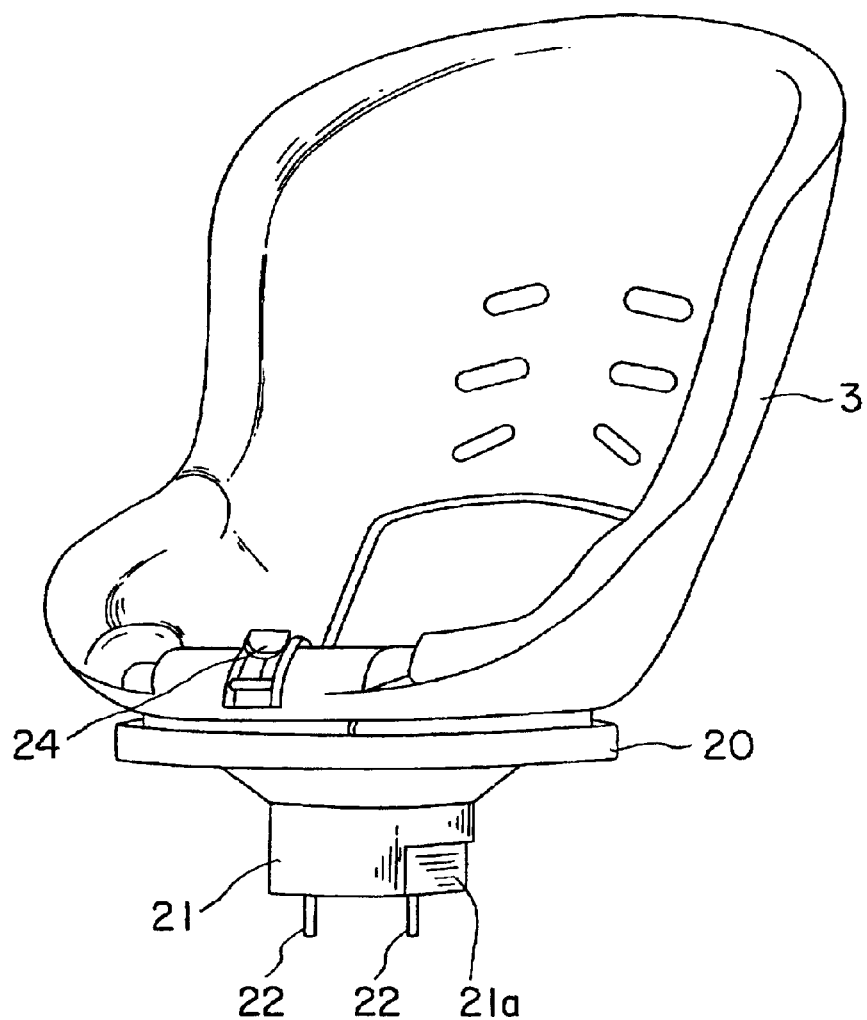
FIG. 7 is a perspective view of a seat body.

Referring to FIGS. 2 and 7, the seat body 3 mounted on the sliding base 2 is provided in its lower part with a disk 20, and a sliding foot 21 extending through the sliding base 9 and engaging in the guide structure 9. As shown in FIG. 6, the sliding foot 21 has opposite, parallel flat side surfaces 21a capable of sliding along the parallel side walls of the tilt adjustment section 10, and opposite, circular side surfaces 21b respectively formed in a front and a rear section thereof and capable of sliding along the cylindrical side wall of the situation inversion section 11.

Figure 8:
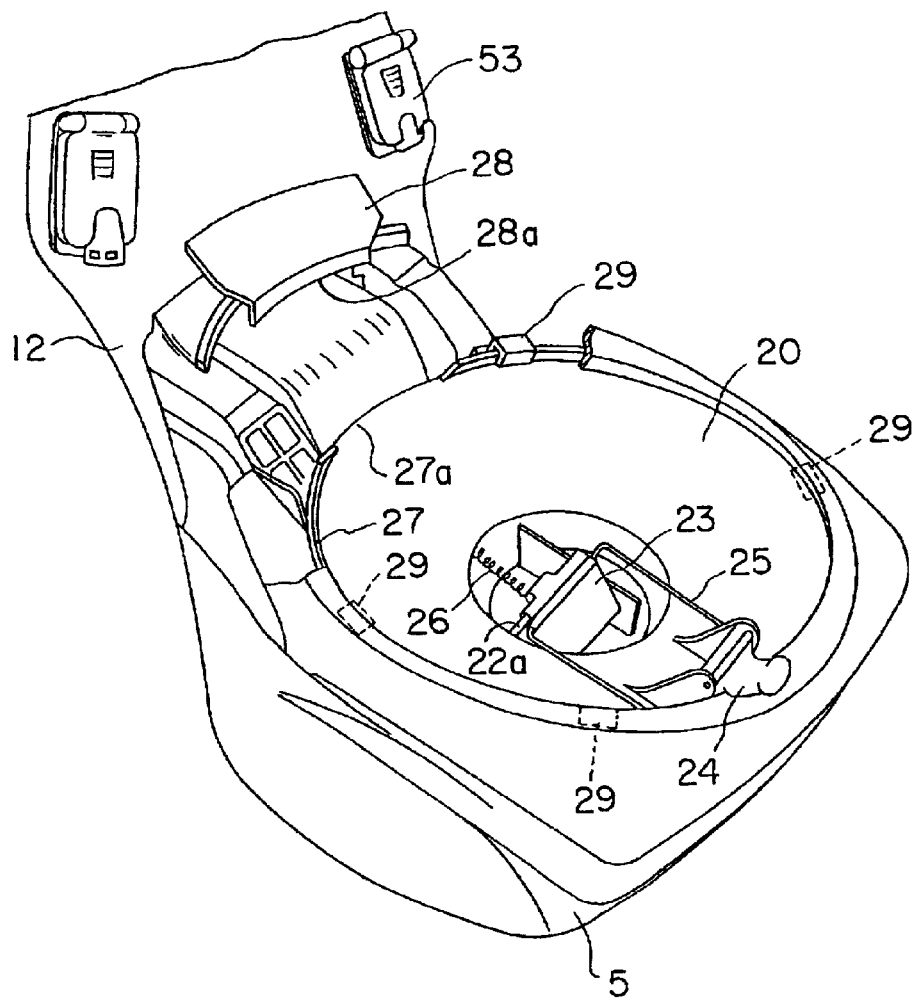
FIG. 8 is a perspective view of a partly disassembled child car seat shown in FIG. 1.
Figure 12:
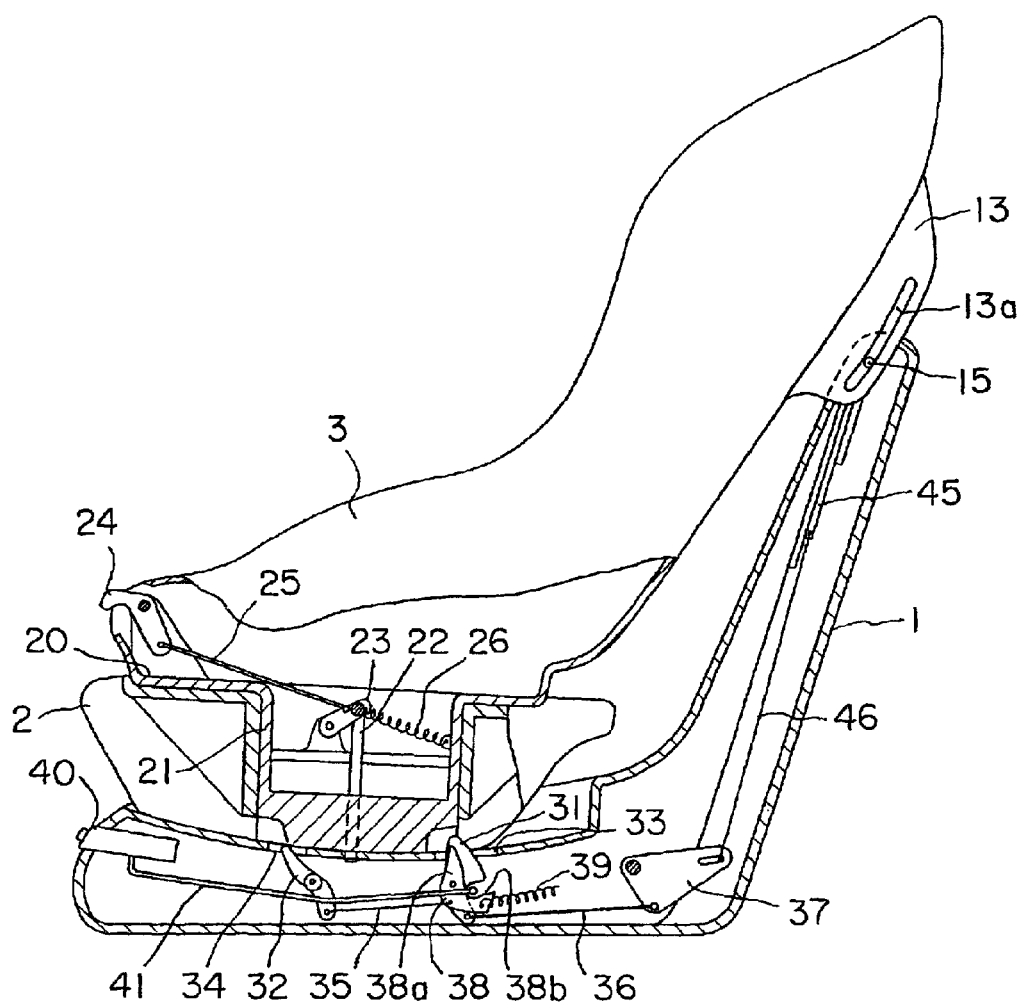
FIG. 12 is a longitudinal sectional view of the seat body.

Two locking pins 22 are extended through the sliding foot 21 and lower parts of the locking pins 22 project downward from the sliding foot 21. The lower parts of the locking pins 22 are inserted selectively in one of the pairs of first locking holes 16 or the pair of second locking holes 17. The upper ends of the locking pins 22 are connected by a connecting part 22a. Referring to FIGS. 8 and 12, a reclining cam 23 pivotally held on the disk 20 has one end pivotally supporting the connecting part 22a and the other end connected by a link to a releasing lever 24 pivotally supported on a front part of the disk 20. A spring 26 is extended between the reclining cam 23 and the disk 20 so as to urge the two locking pins 22 downward.

When the releasing lever 24 is turned up, the reclining cam 23 is turned by the link 25 to pull up the locking pins 22 against the resilience of the spring 26. Consequently, the locking pins 22 are pulled out of the pair of first locking holes 16 or the pair of second locking holes 17, and the sliding base 2 and the seat body 3 are disengaged from the cradle 1. When the releasing lever 24 is released, the spring 26 forces the locking pins 22 to move down into the pair of first locking holes or the pair of second locking holes 17. Consequently, the sliding base 2 and the seat body 3 are restrained from movement relative to the cradle 1.

The disk 20 is provided with a circumferential rail 27. A plurality of guides 29 are attached to the sliding base 2 so as to engage the circumferential rail 27 from above. The guides 29 guide the disk 20 for turning together with the seat body 3 on the sliding base 2. As shown in FIG. 8, the circumferential rail 27 has a gap 27a formed in a part thereof that is positioned on the rear side when the seat body 3 is set in the forward-turned position (forward position).

The standing part 12 of the cradle 1 is provided in its lower part with a guide 28. The guide 28 engages the circumferential rail 27 when the sliding foot 21 of the seat body 3 is positioned in the situation inversion section 11. The guide 28 is provided with a guide wall 28a extending downward from its free edge. The inner circumference of the circumferential rail 27 slides along the guide wall 28a.

Figure 10:
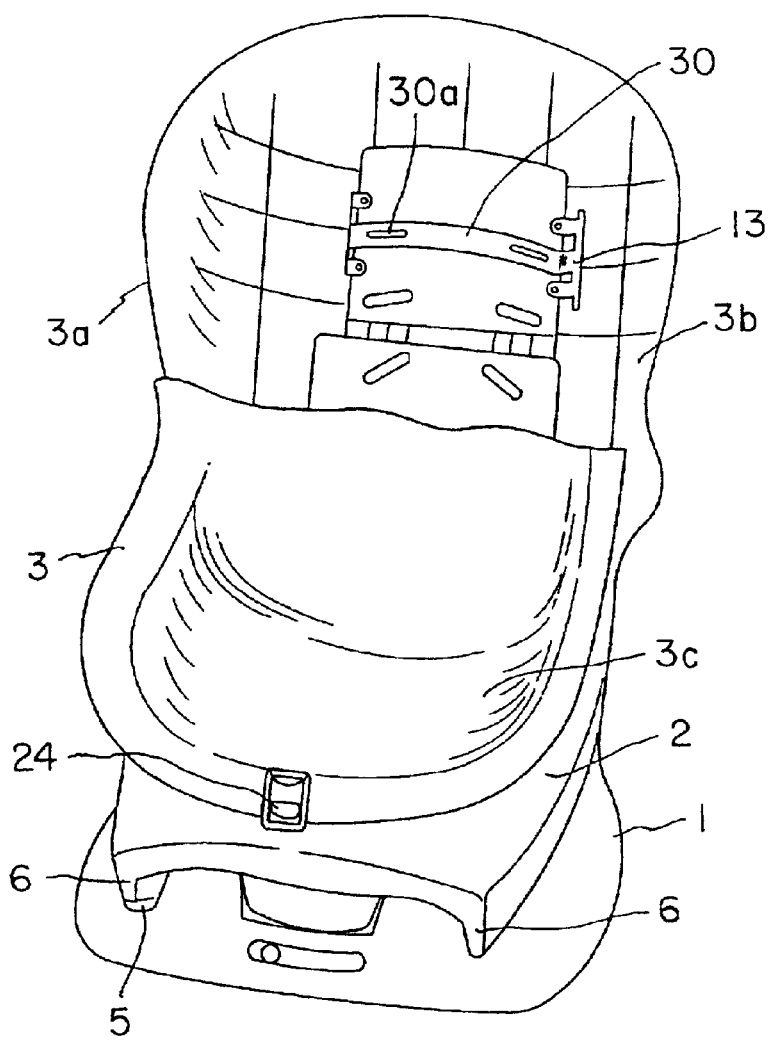
FIG. 10 is a view of the seat body provided with a deformation-preventing reinforcing plate.
Figure 11:
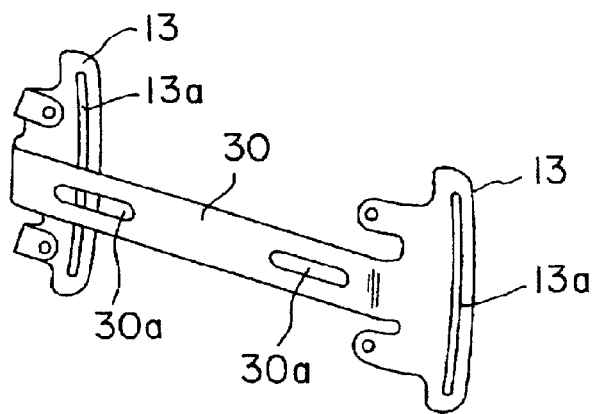
FIG. 11 is a perspective view of the deformation-preventive reinforcing plate.

As shown in FIG. 10, a deformation-preventive reinforcing member 30 is attached to the back surface of an upper part of a frame 3a of a backrest part 3b in the seat body 3. Referring to FIG. 11, opposite end parts of the deformation-preventive reinforcing member 30 are bent backward to form guide parts (connecting parts) 13 respectively provided with circular guide slots 13a. The guide parts (connecting parts) 13 of the deformation-preventive reinforcing member 30 are slidably fitted in the side grooves 14 of the standing part 12 of the cradle 1, and the connecting pins 15 are extended through the guide slots 13a, respectively. The deformation preventive reinforcing member 30 is provided with belt openings 30a to reinforce belt openings.

When the seat body 3 is set in the forward-turned position as shown in FIG. 3, the sliding foot 21 is in the tilt adjustment section 10, the locking pins 22 is fitted in one of the pairs of first locking holes 16, and the connecting pins 15 are extended through the guide slots 13a of the guide parts 13. The tilt of the seat body 3 can be adjusted by moving the seat body 3 between a position indicated by continuous lines and a position indicated by chain lines by turning the releasing lever 24 up to pull the locking pins 22 out of the first locking holes 16, longitudinally sliding the seat body 3 to a desired position and inserting the locking pins 22 in the first locking holes 16 corresponding to the desired position.

Figure 9:
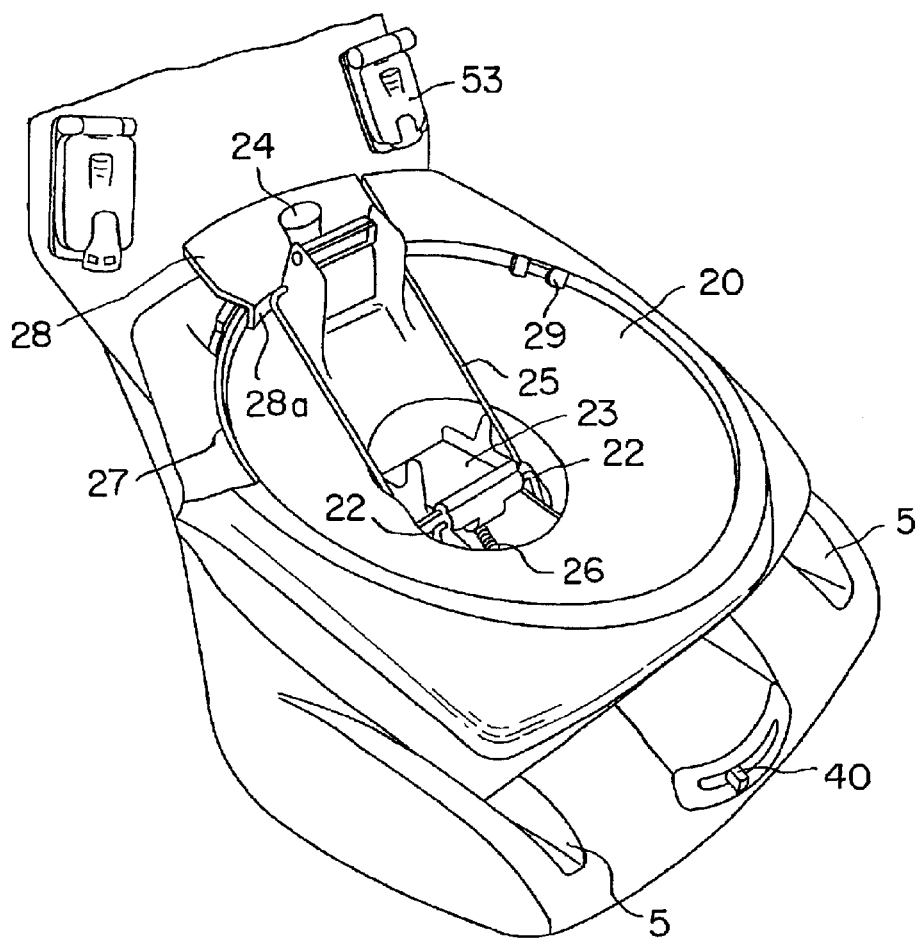
FIG. 9 is a view, similar to FIG. 8, of the child car seat in a state where the seat body is inverted.

When the locking pins 22 are pulled out of the first locking holes 16 and the seat body 3 is shifted rearward to place the sliding foot 21 in the situation inversion section 11, the connecting pins 15 are retracted by the rearward movement of the sliding foot 21, which will be described later, to release the guide parts 13. Then the seat body 3 is set in a position indicated by continuous lines in FIG. 4. In this state, a rear part of the disk 20 is inserted in a space under the guide 28. Then, the set body 3 is turned through an angle of 180° for inversion to set the seat body in the backward-turned position (backward position) as indicated by chain lines in FIG. 4. After that, the locking pins are fitted in the second locking holes 17 to hold the seat body 3 in the backward-turned position, and the circumferential rail 27 of the disk 20 engages the guide wall 28a of the guide 28 as shown in FIG. 9 to restrain the longitudinal movement of the seat body 3 with reliability.

Figure 13:
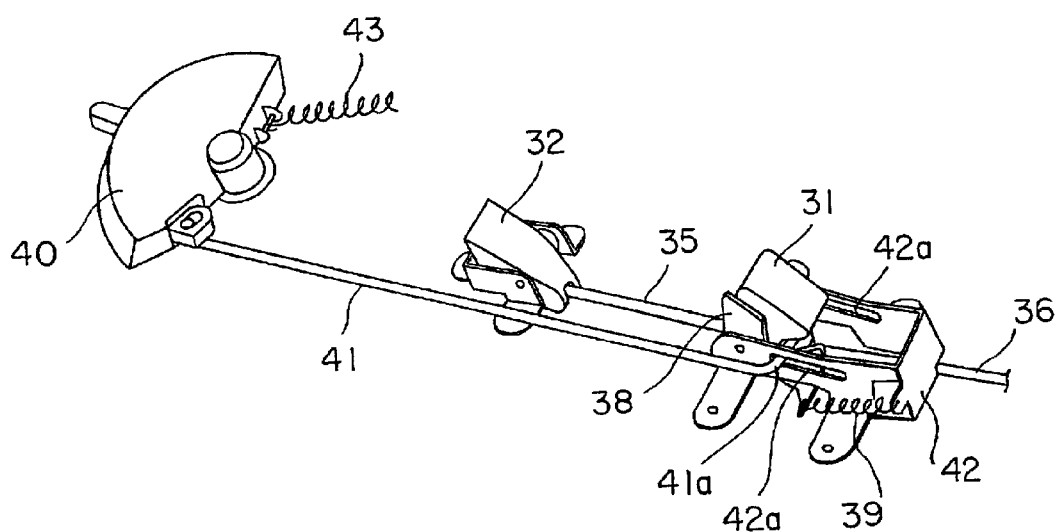
FIG. 13 is a perspective view of a cam operating mechanism for operating first and second cams.

Referring to FIGS. 12 and 13, a first cam 31 is supported for turning below the situation inversion section 11, and a second cam 32 is supported for turning below the tilt adjustment section 10. The first cam 31 and the second cam 32 are able to protrude upward through openings 33 and 34 formed in the tilt adjustment section 10, respectively. The cams 31 and 32 are interlocked by a link 35 such that, when one of the first cam 31 and the second cam 32 is raised so that an end part thereof protrudes into the guide structure 9, the other is lowered beneath the guide structure 9. When the sliding foot 21 moves from the tilt adjustment section into the situation inversion section 11, the sliding foot 21 pushes the first cam 31 down, so that the second cam 32 is raised. When the sliding foot 21 moves from the situation inversion section 11 into the tilt adjustment section 10, the sliding foot 21 pushes the second cam 32 down, so that the first cam 31 is raised. A rod 36 has one end connected to a lower end part of the first cam 31 and the other end connected to a bell crank 37 supported on a rear part of the cradle 1.

A locking cam 38 is supported for turning on a shaft supporting the first cam31. The locking cam 38 has a locking nose 38a that protrudes into the situation inversion section 11, and a projection part 38b having a beveled front side 38c and extending behind the locking nose 38a. The locking cam 38 is urged by a locking cam spring 39 so that the locking nose 38a protrudes into the situation inversion section 11.

An operating dial 40 provided with a knob 40a is supported for turning about a vertical axis on the front wall of the cradle 1. An operating rod 41 has one end connected to one end of the operating dial 40 and the other end 41a formed in an L-shape. The L-shaped end 41a of the operating rod 41 is extended through longitudinal slots 42a formed in a support member 42 supporting the first cam 31 and the locking cam 38 for turning so as to engage rear parts of the first cam 31 and the locking cam 38. A dial spring 43 has one end connected to the other end of the operating dial 40 to urge the operating dial 40 so that the operating rod 41 is urged forward.

Figure 14:
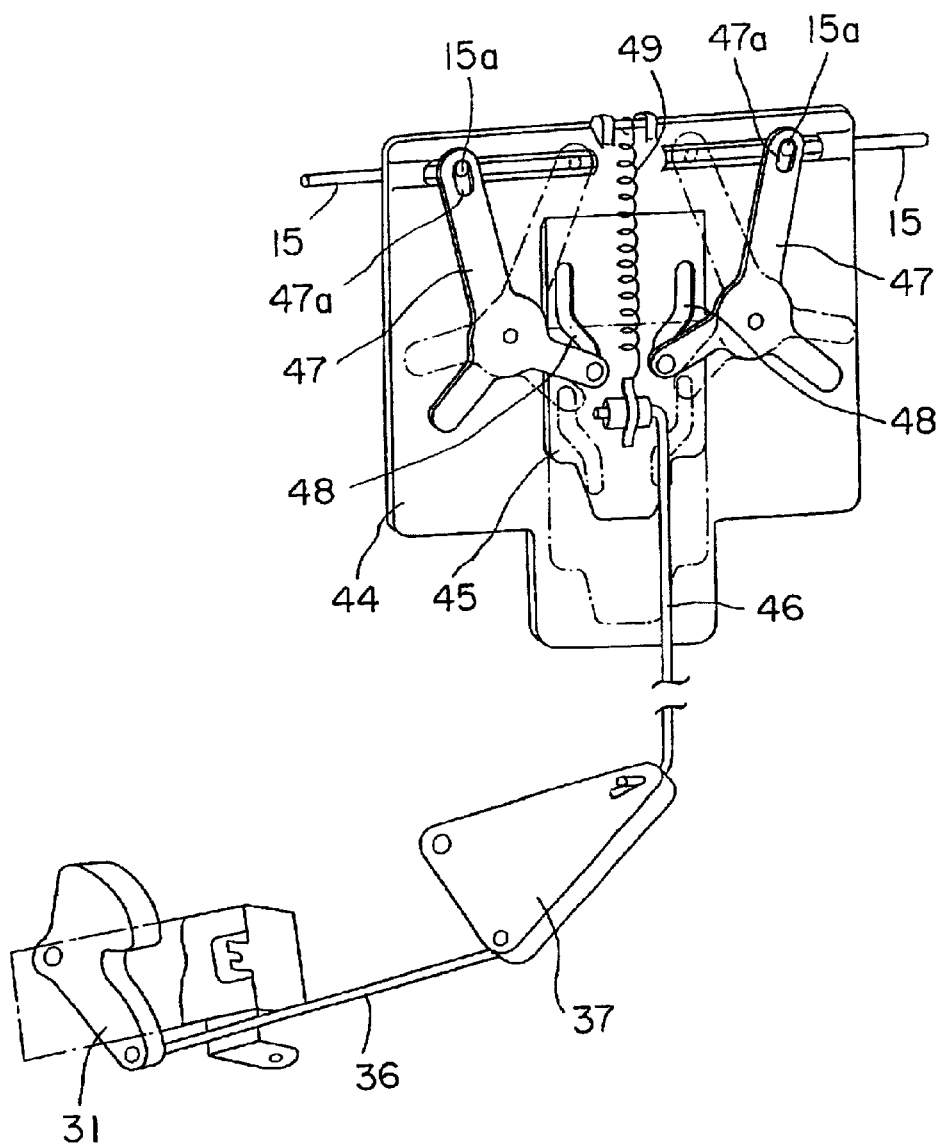
FIG. 14 is a perspective view of a connecting pin operating mechanism.

As shown in FIG. 14, a connecting pin holding plate 44 is attached to an upper part of the back side of the standing part 12 of the cradle 1. A cam plate 45 is supported for vertical movement on the connecting pin holding plate 44 and is connected to the bell crank 37 by a rod 46. Operating arms 47 are disposed on the opposite sides of the cam plate 45 and are supported for turning on the connecting pin holding plate 44. Bent ends 15a formed by bending inner end parts of the connecting pins 15 are inserted in slots 47a formed in upper parts of upper arms of the operating arms 47, respectively. Pins attached to the operating arms 47 are inserted in cam grooves 48 formed in the cam plate 45, respectively. A spring 49 is extended between the cam plate 45 and the connecting pin holding plate 44 to urge the cam plate 45 upward. When the cam plate 45 is pulled downward against the resilience of the spring 49, the cam grooves 48 turn the operating arms 47 so that the upper ends of the operating arms 47 approach each other and, consequently, the connecting pins 15 are retracted.

Figure 15A:
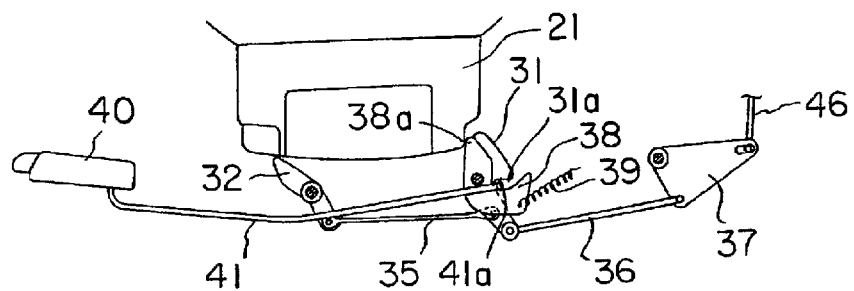
FIGS. 15A to 15D are views of assistance in explaining operations of the first and the second cam.

Normally, the operating rod 41 is pulled forward, the operating rod 41 engages a recess 31a formed in the first cam 31, and the first cam 31 and the locking cam 38 are restrained from turning by the operating rod 41 because the operating dial 40 is urged in a fixed direction by the dial spring 43. Therefore, the seat body 3 cannot be moved into the situation inversion section 11 even if the sliding foot 21 engages the first cam 31 and the locking cam 38 and tries to turn the first cam 31 and the locking cam 38 because the first cam 31 and the locking cam 38 a rerestrained from turning by the operating rod 41 as shown in FIG. 15A.

Figure 15B:
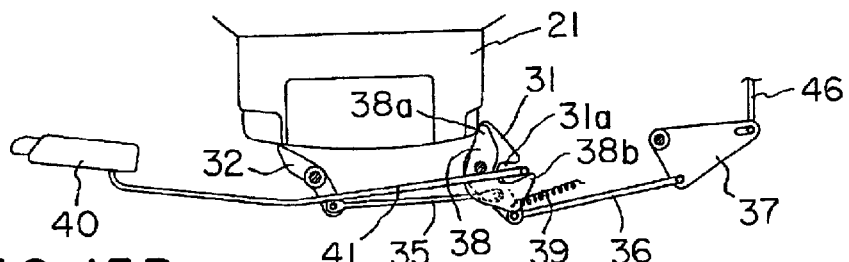
Figure 15C:
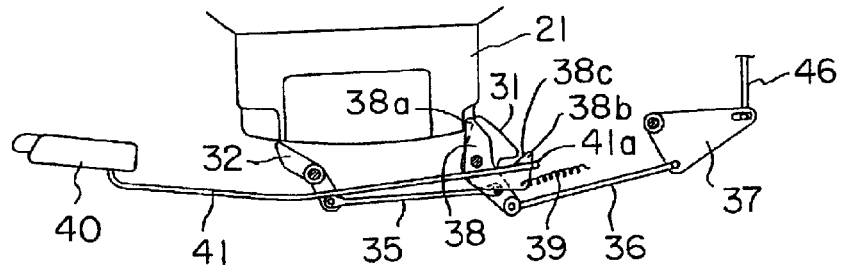

When the operating dial 40 is turned counterclockwise, as viewed in FIG. 13, to turn the seat body 3 from the forward-turned position to the backward-turned position, the L-shaped end 41a of the operating rod 41 slides along the slots 42a of the support member 42 and moves out of the recess 31a of the first cam 31 as shown in FIG. 15B to release the first cam 31. consequently, the seat body 3 can be moved into the situation inversion section 11. When the operating dial 40 is turned further counterclockwise in this state, the L-shaped end 41a engages the projecting part 38b of the locking cam 38, turns the locking cam 38 and climbs over the projecting part 38b after turning the locking cam 38. Consequently, the locking cam 38 is returned to its initial position by the locking cam spring 39, the L-shaped end 41a of the operating rod 41 engages the rear edge of the locking cam 38 to hold the locking cam 38 in an unlocking state as shown in FIG. 15C.

When the seat body 3 is moved into the situation inversion section 11 in this state, the sliding foot 21 pushes the first cam 31 and the locking cam 38 to turn the same clockwise. Consequently, the rod 36 turns the bell crank 37 clockwise to pull the cam plate 45 downward by the rod 46 against the resilience of the spring 49. Thus the operating arms 47 are turned so as to retract the connecting pins 15 to release the guide parts 13 of the seat body 3 from the cradle 1.

Figure 4:
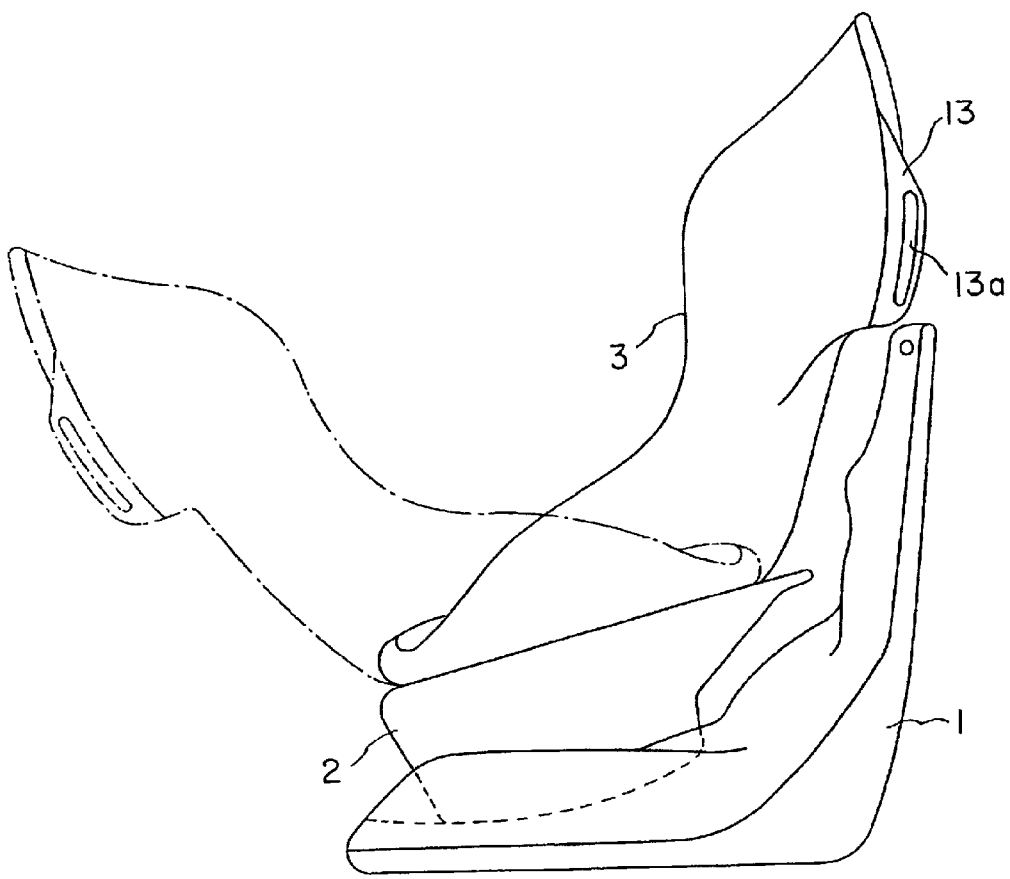
FIG. 4 is a view of assistance in explaining a state where the child car seat shown in FIG. 1 is set in a backward-turned position.

The guide parts 13 are moved out of the pair of side grooves 14 of the standing part 12 of the cradle 1 as indicated by continuous lines in FIG. 4 after the seat body 3 has been completely shifted to the situation inversion section 11. When the seat body 3 is turned through an angle of 180° for inversion after the same has been shifted to the situation inversion section 11, the locking pins 22 can be fitted in the second locking holes 17 to secure the seat body 3 in the backward-turned position.

Figure 15D:
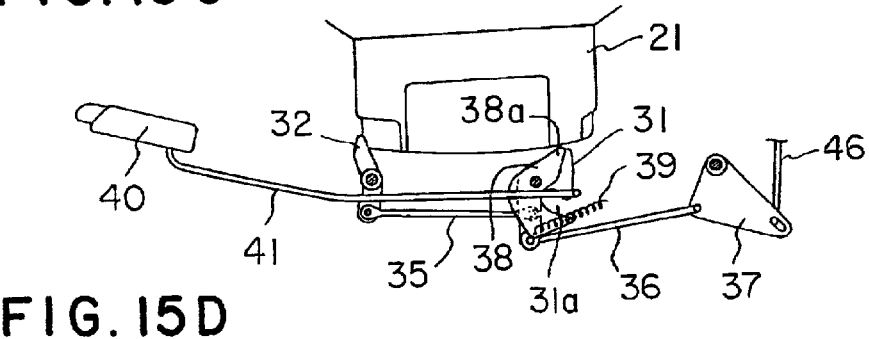

On the other hand, the operating rod 41 is in engagement with the first cam 31 in a backward-tilted position as shown in FIG. 15D and hence the operating rod 41 is unable to return to its initial position.

When turning the seat body 3 from the backward-turned position to the forward-turned position, the releasing lever 24 is operated to extract the locking pins 22 from the second locking holes 17, the seat body 3 is turned to the forward-turned position, and then the seat body 3 is moved into the tilt adjustment section 10. Consequently, the sliding foot 21 engages the second cam 32 and turns the same counterclockwise, and the rod 35 returns the first cam 31 to its initial position. Consequently, the cam plate 45 is pulled upward, the upper ends of the operating arms 47 are turned away from each other, and the connecting pins 15 are moved outward into the slots 13a of the guide parts 13. During the foregoing operations, the cam plate 45 is surely pulled up by the spring 49. Thus, the seat body 3 can be moved toward the front to a desired position, the locking pins 22 are fitted in the first locking holes 16 corresponding to the desired position and thereby the seat body can be secured in the forward-turned position.

When the seat body 3 is thus set in the forward-turned position, the connecting pins 15 are inserted in the slots 13a of the guide parts 13 of the deformation-preventive reinforcing member 30. Therefore, the seat body 3 and the cradle 1 are connected by the engagement of the guide parts 13 and the connecting pins 15, and the guide parts 13 holds the seat body 3 on the cradle 1. The deformation-preventive reinforcing member 30 enhances the rigidity of the part of the seat body 3 to securely hold the seat body 3 on the cradle 1 to prevent the backrest part of the seat body 3 from being deformed so as to warp forward by shocks that may be exerted thereon.

The seat body 3 is disconnected automatically from the cradle 1 when the seat body 3 is moved to change the seat body 3 from the forward-turned position to the backward-turned position, and the seat body 3 is connected automatically to the cradle 1 when the seat body 3 is moved to change the seat body 3 from the backward-turned position to the forward-turned position. Thus, the position of the seat body 3 can be easily changed without requiring troublesome operations.

In a state where the seat body 3 is set in the situation inversion section 11, the seat body 3 is disengaged from the cradle 1. Therefore, the seat body 3 may be unsatisfactorily secured and the child car seat is unable to function properly if the seat body is set in the forward-turned position.

Figure 16:
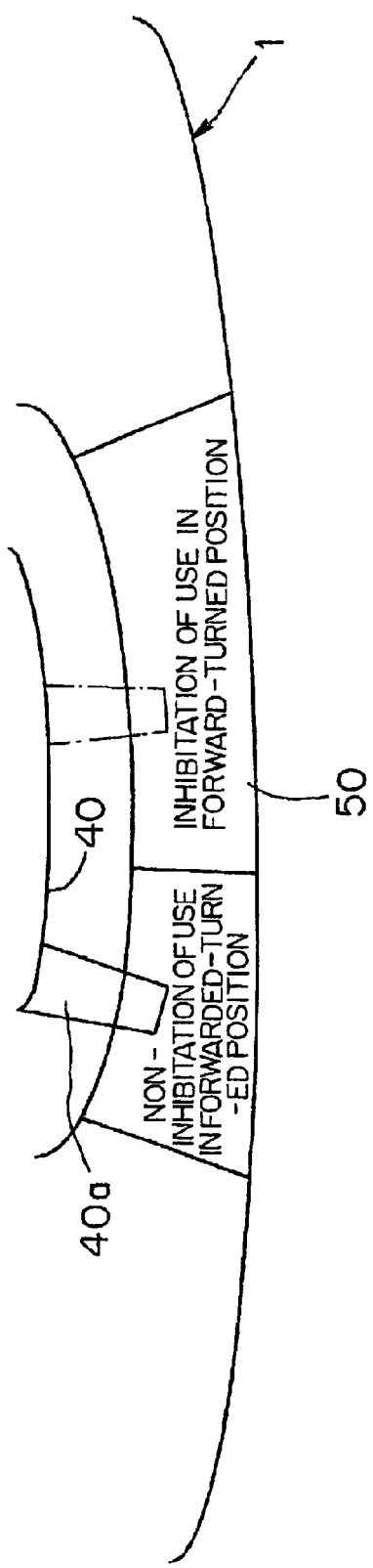
FIG. 16 is a view of a sheet attached to the front surface of the cradle.

The seat body 3 is unable to move from the tilt adjustment section 10 into the situation inversion section 11 unless the operating dial 40 is operated. The operating rod 41 is held at the releasing position and the operating dial 40 is held at an angular position dependent on the position of the operating rod 41 in a state where the first cam 31 is unlocked. As shown in FIG. 16, a label 50 indicating a message signifying the permission of use of the child car seat in the forward-turned position and a message signifying the inhibition of use of the child car seat in the forward-turned position is stuck on a part of the front surface of the cradle under the operating dial 40 to prevent the use of the child car seat in the forward-turned position after the seat body 3 has been moved into the situation inversion section 11. In a state where the operating dial 40 is positioned at an unlocking position for unlocking the first cam 31, the knob 40a of the operating dial 40 corresponds to a section indicating the message signifying the inhibition of use of the child car seat in the forward-turned position of the label 50. The label 50 enables the confirmation of whether or not the child car seat is set correctly and prevents the wrong use of the child car seat.

Figure 17:
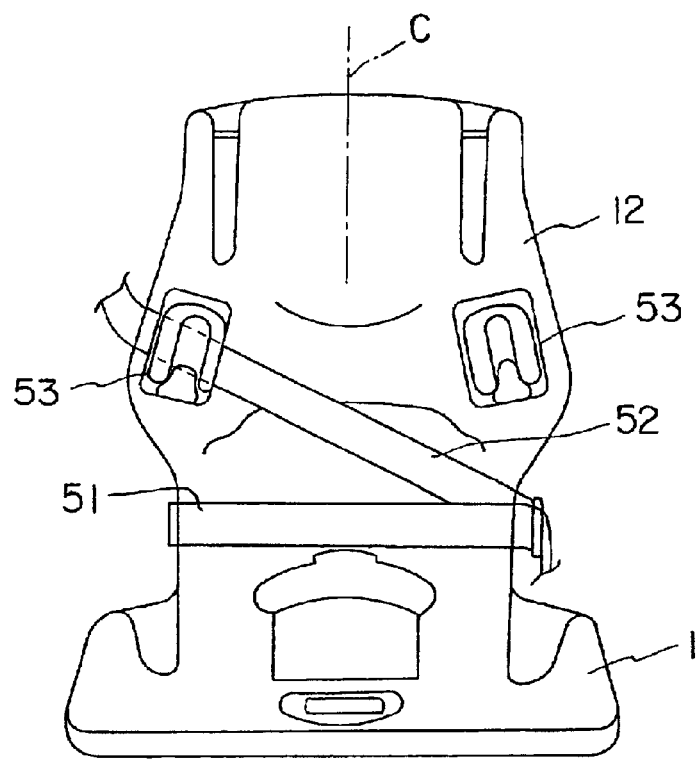
FIG. 17 is front elevation of the cradle as fastened in place by a seat belt.

The child car seat is put on and fastened to a seat of a passenger car with a seat belt. As shown in FIG. 17, a rear part of the cradle 1 is fastened to the seat of the passenger car with a lap belt 51, and the standing part 12 of the cradle 1 is fastened to the backrest of the seat with a shoulder strap 52.

Figure 18:
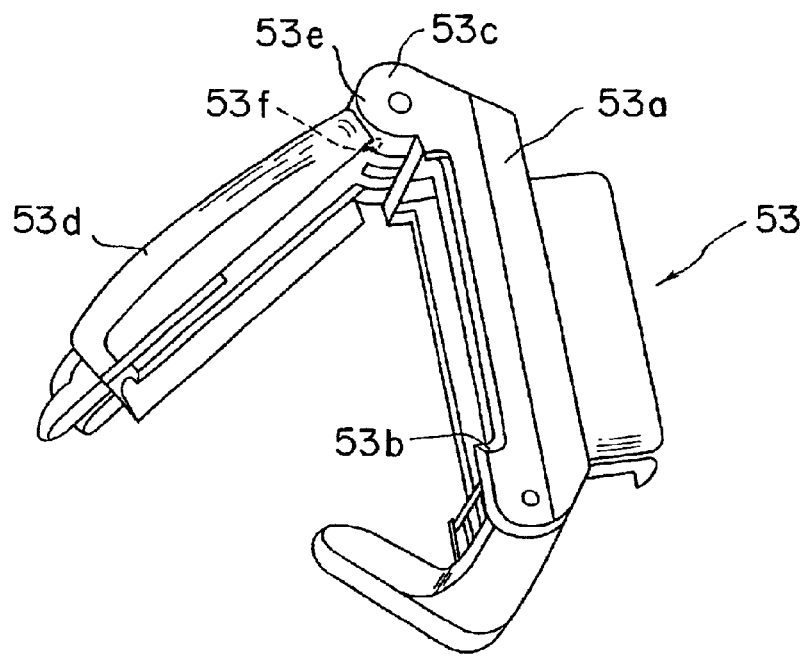
FIG. 18 is a perspective view of a lock-off device in a state where a lid is opened.

Lock-off devices 53 are disposed on right and left parts of the front wall of the standing part 12 as shown in FIG. 17 to fasten the shoulder strap 52 to the standing part 12 of the cradle 1. The lock-off devices 53 are tilted so that upper ends thereof are turned toward the center axis c of the standing part 12 so as to conform to the inclination of the shoulder strap 52. As shown in FIG. 18, a guide recess 53b for guiding the shoulder strap 52 is formed in the front side of a base part 53a of each lock-off device 53. When fastening the standing part 12 by the shoulder strap 52, the obliquely extending shoulder strap 52 intersects the lock-off device 53 substantially perpendicularly and is not guided by the recess 53b and hence the shoulder strap 52 can be easily tightened.

A lid supporting knuckle 53c of the base part 53a has an eccentric outer circumference. When a lid 53d supported by the lid supporting knuckle 53c is tuned in an opening direction, a large part 53e of the lid supporting knuckle 53c engages a base end part of the lid 53d and hence the lid 53d does not close while the shoulder strap 52 is handled. Thus, the lid 53d does not need to be held by hand while the lid 53d is kept open and the shoulder strap 52 is being passed through the lock-off device 53, which facilitates handling the shoulder strap 52. The circumference of the lid supporting knuckle 53c may be formed in a cylindrical shape and a small projection may be formed on the cylindrical circumference instead of forming the circumference in an eccentric shape.

Figure 19:
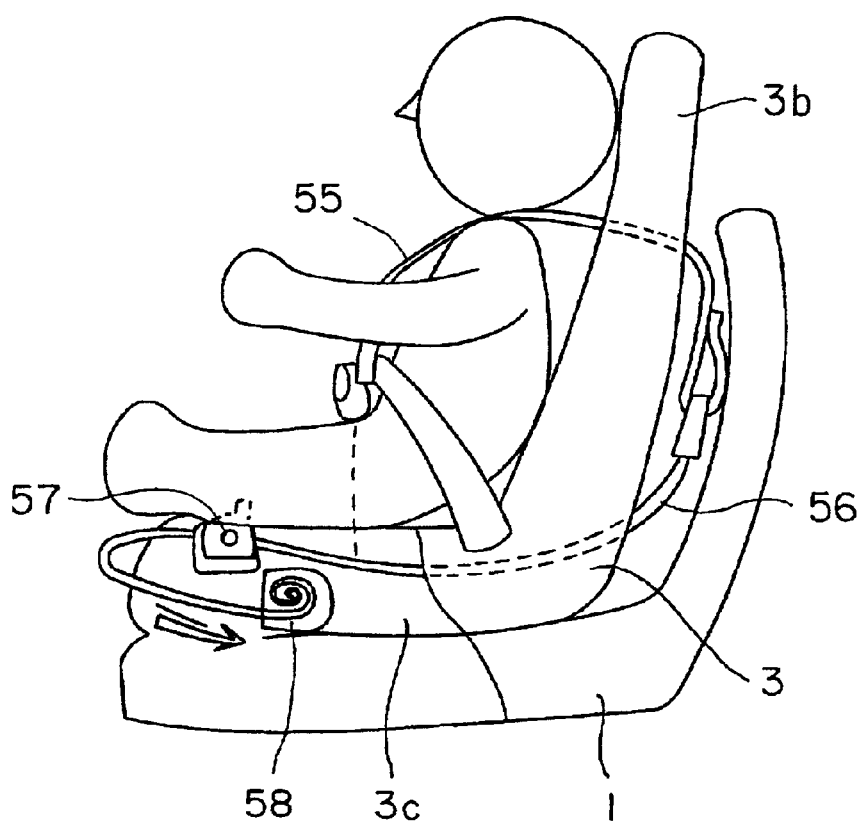
FIG. 19 is a schematic view of a child holding belt.

When seating a child on the child car seat and fastening the child to the child car seat with a child holding belt having a lap belt and a shoulder strap 55, the length of the shoulder strap 55 must be adjusted according to the size of the child. As shown in FIG. 19, an adjusting belt 56 is connected to the shoulder strap 55, one end part of the adjusting belt 56 is extended along the back side of the seat body 3 and connected to the shoulder strap 55 behind the seat body 3, and the other end part of the adjusting belt 56 is passed through a quick-adjuster 57 attached to a front part of a bottom part 3C of the seat body 3 and is connected to an automatic take-up device 58 disposed inside the seat body 3.

After seating a child on the child car seat, the adjusting belt 56 is pulled to adjust the length of a part of the shoulder strap 55 wound around the child. A slack in the adjusting belt 56 thus pulled to adjust the length of the shoulder strap 55, is taken up by the automatic take-up device 58 automatically. Thus, the adjusting belt 56 does not extend loosely around the front part of the seat body 3 and hence it is possible to prevent unexpected accidents, such as a slack part of the adjusting belt 56 twining around the child's legs or other things, and a slack part of the adjusting belt 56 being caught between the seat body 3 and a thing around the seat body 3 when the seat body 3 is turned.

As apparent from the foregoing description, according to the present invention, the seat body can be turned between the backward-turned position and the forward-turned position, and the seat body set in the forward-turned position is connected to the standing part of the cradle by the connecting device. Therefore, the rigidity of the backrest part of the seat body can be enhanced, and the deformation of the seat body caused by shocks exerted on the seat body by collision or the like can be limited to the least extent.

According to the present invention, the L-shaped end of the operating rod laterally extending behind the first cam locks and unlocks the first cam when the operating rod is moved longitudinally, and then the first cam protruding into the situation inversion section releases the seat body from the cradle when the sliding foot of the seat body engages and pushes down the first cam. When changing the setting of the child car seat from the forward-turned position to the backward-turned position, the first cam is unlocked only when the operating rod is operated and the seat body can be moved to a position where the seat body can be turned. Therefore, it is possible to prevent the use of the child car seat in the forward-turned position without connecting the seat body to the cradle after the seat body has been moved by mistake into the situation inversion section.

According to the present invention, the deformation-preventive reinforcing member is attached to a region of the backrest part made of molding resin in which a child holding belt passes openings. The deformation-preventive member enhances greatly the rigidity of the corresponding region of the backrest part without depending on the rigidity of the backrest part formed of molding resin. Therefore, the frame formed of molding resin does not need to be provided with many ribs and such a frame can be easily accurately molded.

According to the present invention, the automatic take-up device is disposed inside the seat body and the free end of the adjusting belt is connected to the automatic take-up device. Therefore, a slack in the adjusting belt after adjusting the length of the shoulder strap can be taken up by the automatic take-up device, and hence it is possible to prevent a slack part of the adjusting belt twining around the chlid's legs or other things, and a slack part of the adjusting belt being caught between the seat body and a thing around the seat body when the seat body is turned.

What is claimed is:

1. A child car seat comprising:

a cradle to be fastened to a seat of a vehicle, having a base part and a standing part;

a sliding base mounted slidably in a longitudinal direction on the cradle, wherein the sliding base tilts gradually as the sliding base slides on the cradle; and a seat body having a backrest part, and being turnably supported on the sliding base and locked to the cradle in a forward-turned position and in a backward-turned position of the seat body.

2. The child car seat cornprising:

a cradle to be fastened to a seat of a vehicle, having a base part and a standing part;

a sliding base mounted slidably in a longitudinal direction on the cradle;

a seat body having a backrest part, and being turnably supported on the sliding base;

wherein the seat body is provided in its lower part with a disk having a circumferential rail, and the standing part of the cradle is provided with a guide part that engages the circumferential rail to control the sliding movement of the sliding base.

3. The child car seat comprising:

a cradle to be fastened to a seat of a vehicle, having a base part and a standing part;

a sliding base mounted slidably in a longitudinal direction on the cradle;

a seat body having a backrest part, and being tumably supported on the sliding base;

wherein the base part of the cradle is provided with a guide structure having a straight tilt adjustment section having parallel side walls, and a situation inversion section having the shape of a cylindrical recess and connected to one end of the tilt adjustment section, and the seat body is provided with a sliding foot penetrating the sliding base, and capable of turning in and sliding along the guide structure.

4. The child car seat according to claim 3, wherein the sliding foot of the seat body has parallel, opposite side surfaces that slide along the parallel side walls of the tilt adjustment section, and circular parts that slide along a cylindrical side surface of the situation inversion section.

5. The child car seat according to claim 3, wherein the sliding foot of the seat body is provided with a pair of locking pins for vertical movement interlocked with a releasing lever on the seat body, the tilt adjustment section is provided with a plurality of pairs of first locking pins, the pair of locking pins engage selectively in one of the pairs of first locking holes, and the situation inversion section is provided with a pair of second locking holes to receive the pair of locking pins therein.

6. The child car seat according to claim 5, wherein the distance between each pair of first locking holes of the tilt adjustment section is equal to that of the pair of second locking holes of the situation inversion section.

7. The child car seat according to claim 6, wherein each pair of first locking holes of the tilt adjustment section and the pair of second locking holes of the situation inversion section are laterally offset with respect to the longitudinal center axis of the cradle in opposite directions, respectively.

8. A child car seat comprising:

a cradle to be fastened to a seat of a vehicle, having a base part and a standing part;

a sliding base mounted slidably in a longitudinal direction on the cradle; and a seat body having a backrest part, and being turnably supported on the sliding base and locked to the cradle in a forward-turned position and in a backward-turned position of the seat body, wherein the seat body is provided on the back side of the backrest part with connecting parts that engage the standing part of the cradle and wherein the standing part of the cradle is provided with connecting pins that engage the connecting parts of the seat body.

9. The child car seat according to claim 8, wherein the connecting pins of the standing part of the cradle are capable of sliding and of being released from the connecting parts.

10. The child car seat according to claim 9, wherein the slidable connecting pins are connected to operating arms engaged in cam grooves formed in a cam plate vertically movably mounted on the standing part of the cradle, the cam plate is interlocked with a first cam projecting from the cradle into the situation inversion section and capable of being pushed down by the sliding foot of the seat body, the first cam is pushed down to move the cam plate to retract and release the connecting pins from the connecting parts of the seat body, respectively.

11. The child car seat according to claim 10, wherein a second cam projects from the tilt adjustment section of the cradle, the second cam is interlocked with the first cam, and the second cam is pushed down by the sliding foot to make the connecting pins through the first cam engage with the connecting parts as the sliding foot is moved from the situation inversion section to the tilt adjustment section.

12. The child car seat according to claim 10, wherein an operating rod capable of being moved forward and backward, is connected to the first cam to lock and unlock the first cam, and an operating dial connected to the operating rod is disposed on a front surface of the cradle.

13. The child car seat according to claim 12, wherein a locking cam is mounted on the same shaft as the first cam in the cradle and is urged so as to project from the situation inversion section, the locking cam is provided with a projection to hold the operating rod at an unlocking position when the operating rod is moved to the unlocking position to unlock the first cam.

14. The child car seat according to claim 13, wherein a bend formed in a rear end part of the operating rod extends laterally behind the first cam and the locking cam.

15. The child car seat according to claim 14, wherein a projecting part of the locking cam has a front bevel surface extending obliquely upward toward the rear, the bend of the operating rod engages the bevel surface to turn the locking cam when the operating rod is shifted rearward, and the bend engages a rear surface of the projection to hold the operating rod at a releasing position when the bend climbs over the projection.

16. The child car seat according to claim 1, wherein a deformation-preventive reinforcing member is attached to a part of a frame corresponding to the backrest part of the seat body.

17. The child car seat according to claim 16, wherein opposite side parts of the defornation-preventive reinforcing plate are bent to form connecting parts for connecting the seat body to the standing part of the cradle.

18. The child car seat according to claim 16, wherein the defornation-preventive reinforcing member is provided at least a pair of openings through which a child holding belt is passed.

19. A child car seat comprising:

a cradle to be fastened to a seat of a vehicle, having a base part and a standing part;

a sliding base mounted slidably in a longitudinal direction on the cradle;

a seat body having a backrest part, and being turnably supported on the sliding base; and wherein lock-off devices for fastening a shoulder strip of a seat belt anchored to the seat of the vehicle are provided on the standing part of the cradle, and each of the lock-offdevices is tilted such that an upper part thereof is closer to a center axis of the child car seat than a lower part thereof.

20. The child car seat according to claim 19, wherein each of the lock-offdevices has a base part, a lid supporting knuckle and a lid supported for turning on the lid supporting knuckle, and the lid can be held at an open position by the lid supporting knuckle.

21. The child car seat according to claim 20, wherein the lid supporting knuckle has an eccentric outer circumference having a large-diameter part, and the lid has a base end which is pressed against the large-diameter part of the lid supporting knuckle when the lid is opened.

22. The child car seat according to claim 20, wherein a small projection is formed on an outer circumference of the lid supporting knuckle of each of the lock-off devices, and a base end of the lid rests on the small projection when the lid is opened.

23. The child car seat according to claim 19, wherein a guide groove for guiding the seat belt is formed in a base part of each of the lock-off devices.

24. The child car seat according to claim 19, further cornprising:

a child holding belt connected to the seat body and having a shoulder strap and an adjusting belt, a quick-adjustment device through which the adjustable belt is passed, capable of adjusting length of the shoulder strap of the child holding belt, and an automatic take-up device provided on the seat body and connected to a free end of the adjusting belt passed through the quick-adjustment device toward the automatic take-up device.

* * * * *